United States Patent
Auernhammer et al.

(10) Patent No.: US 9,286,236 B2
(45) Date of Patent: *Mar. 15, 2016

(54) I/O CONTROLLER AND METHOD FOR OPERATING AN I/O CONTROLLER

(71) Applicant: International Business Machines Corporation, Armonk, NY (US)

(72) Inventors: Florian A. Auernhammer, Zurich (CH); Patricia M. Sagmeister, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,850

(22) Filed: Jan. 29, 2015

(65) Prior Publication Data

US 2015/0149731 A1    May 28, 2015

Related U.S. Application Data

(63) Continuation of application No. 13/705,404, filed on Dec. 5, 2012, now Pat. No. 8,996,840.

(30) Foreign Application Priority Data

Dec. 23, 2011  (EP) .................................. 11195663

(51) Int. Cl.
*G06F 12/00* (2006.01)
*G06F 12/10* (2006.01)
*G06F 12/08* (2006.01)
*G06F 12/12* (2006.01)

(52) U.S. Cl.
CPC ........ *G06F 12/1063* (2013.01); *G06F 12/0862* (2013.01); *G06F 12/10* (2013.01); *G06F12/1027* (2013.01); *G06F 12/1081* (2013.01); *G06F 12/122* (2013.01); *G06F 2212/50* (2013.01); *G06F 2212/602* (2013.01)

(58) Field of Classification Search
CPC .. G06F 12/00; G06F 12/0215; G06F 12/0223
USPC .......................... 711/100, 137, 154, 200, 202
See application file for complete search history.

(56) References Cited

U.S. PATENT DOCUMENTS

| | | | |
|---|---|---|---|
| 4,525,780 A * | 6/1985 | Bratt | G01R 31/318505 711/163 |
| 7,487,297 B2 | 2/2009 | El-Essawy et al. | |
| 2003/0167385 A1* | 9/2003 | Lai | G06F 13/161 711/167 |
| 2006/0212658 A1* | 9/2006 | Hrle | G06F 12/0862 711/137 |
| 2010/0262633 A1* | 10/2010 | Bhattacharjee | G06F 17/30312 707/812 |

FOREIGN PATENT DOCUMENTS

JP    2010217992 A    9/2010

OTHER PUBLICATIONS

Zhu et al., "Timing Local Streams: Improving Timeliness in Data Prefetching" Department of Computer Science Illinois Institute of Technology, Chicago, IL., ICS 10, Jun. 2-4, 2010, pp. 1-10.

* cited by examiner

*Primary Examiner* — Tuan Thai
(74) *Attorney, Agent, or Firm* — Cantor Colburn LLP

(57) ABSTRACT

An I/O controller, coupled to a processing unit and to a memory, includes an I/O link interface configured to receive data packets having virtual addresses; an address translation unit having an address translator to translate received virtual addresses into real addresses by translation control entries and a cache allocated to the address translator to cache a number of the translation control entries; an I/O packet processing unit for checking the data packets received at the I/O link interface and for forwarding the checked data packets to the address translation unit; and a prefetcher to forward address translation prefetch information from a data packet received to the address translation unit; the address translator configured to fetch the translation control entry for the data packet by the address translation prefetch information from the allocated cache or, if the translation control entry is not available in the allocated cache, from the memory.

18 Claims, 11 Drawing Sheets

I/O CONTROLLER AND METHOD FOR OPERATING AN I/O CONTROLLER

This application is a continuation of U.S. patent application Ser. No. 13/705,404, filed Dec. 5, 2012, which claims priority to European Patent Application No.: 11195663.7, filed Dec. 23, 2011, and all the benefits accruing therefrom under 35 U.S.C. §119, the contents of which in its entirety are herein incorporated by reference.

BACKGROUND

The invention relates to an I/O (Input/Output) controller and to a method for operating an I/O controller. The I/O controller is coupled to a processing unit, e.g., a CPU, and to a memory. The I/O controller includes an I/O link interface, an address translation unit and an I/O packet processing unit.

Following the trend for virtualization in processor cores, virtualization is finding increasing adoption in the I/O space as well. Together with the trend for network adapters to provide user-level-like queue based interfaces to the consumers, mainly used for providing each virtual machine running on the system with at least one private queue for interaction with the network device, I/O virtualization support in the I/O root complex, which is usually a Peripheral Component Interconnect (PCI) Express root complex, gains increasing importance. This requires the PCI Express Host Bridge (PHB) to provide address translation capabilities, such that different physical or virtual functions of a device can access their own virtual address space safely. This is becoming an increasing challenge with the increasing line speeds of PCI Express and the high parallelism used by I/O devices that creates little spatial locality in the requests from the device and thus increases the pressure on the root complex address translation unit.

At the same time, the translation caches of the root complex need to be small in order to be able to fit multiple root complexes on a processor to support a large number of links with different link configuration. The caches can also not be shared easily between PHBs as the attached devices usually do not share the same virtual domains and therefore require their own translations and caches. In addition, as mentioned above, virtualized devices in general show little spatial and temporal locality that would improve the efficiency of the translation unit cache.

U.S. Pat. No. 7,487,297 B2 describes a method and an apparatus for performing just-in-time data prefetching within a data processing system comprising a processor, a cache or prefetch buffer, and at least one memory storage device. The apparatus comprises a prefetch engine having means for issuing a data prefetch request for prefetching a data cache line from the memory storage device for utilization by the processor. The apparatus further comprises logic/utility for dynamically adjusting a prefetch distance between issuance by the prefetch engine of the data prefetch request and issuance by the processor of a demand (load request) targeting the data/cache line being returned by the data prefetch request, so that a next data prefetch request for a subsequent cache line completes the return of the data/cache line at effectively the same time that a demand for that subsequent data/cache line is issued by the processor.

JP 2010-217992 shows a cache controller, a cache control method and a cache control program.

Further, timing local streams for improving timeliness in data prefetching are shown in the reference, Timing Local Streams: Improving Timeliness in Data Prefetching; Huaiyu Zhu, Yong Chen and Xian-He Sun; Department of Computer Science; Illinois Institute of Technology Chicago, Ill. 60616.

SUMMARY

In one embodiment, an I/O controller for a processing unit, wherein the I/O controller is coupled to the processing unit and to a memory, includes an I/O link interface configured to receive data packets having virtual addresses; an address translation unit having an address translator configured to translate received virtual addresses into real addresses by translation control entries and a cache allocated to the address translator configured to cache a number of the translation control entries; an I/O packet processing unit for checking the data packets received at the I/O link interface and for forwarding the checked data packets to the address translation unit; and a prefetcher configured to forward address translation prefetch information from a data packet received at the I/O link interface to the address translation unit; wherein the address translator is configured to fetch the translation control entry for the data packet by the address translation prefetch information from the allocated cache or, if the translation control entry is not available in the allocated cache, from the memory.

In another embodiment, a method is disclosed for operating an I/O controller coupled to a processing unit and to a memory, wherein the I/O controller includes an I/O link interface for receiving data packets having virtual addresses, an address translation unit having an address translator for translating received virtual addresses into real addresses by translation control entries and a cache allocated to the address translator for caching a number of the translation control entries, and an I/O packet processing unit for checking the data packets received at the link interface and for forwarding the checked data packets to the address translation unit. The method includes forwarding address translation prefetch information from a data packet received at the I/O link interface to the address translation unit; and fetching the translation control entry for the data packet by means of the address translation prefetch information from the allocated cache or, if the translation control entry is not available in the allocated cache, from the memory.

In another embodiment, a computer program product includes a computer readable storage medium having instructions stored thereon that when executed by a computer, implement a method for operating an I/O controller coupled to a processing unit and to a memory, wherein the I/O controller includes an I/O link interface for receiving data packets having virtual addresses, an address translation unit having an address translator for translating received virtual addresses into real addresses by translation control entries and a cache allocated to the address translator for caching a number of the translation control entries, and an I/O packet processing unit for checking the data packets received at the link interface and for forwarding the checked data packets to the address translation unit. The method includes forwarding address translation prefetch information from a data packet received at the I/O link interface to the address translation unit; and fetching the translation control entry for the data packet by means of the address translation prefetch information from the allocated cache or, if the translation control entry is not available in the allocated cache, from the memory.

BRIEF DESCRIPTION OF THE SEVERAL VIEWS OF THE DRAWINGS

Similar or functionally similar elements in the figures have been allocated the same reference signs if not otherwise indicated.

DETAILED DESCRIPTION

Figure 1:
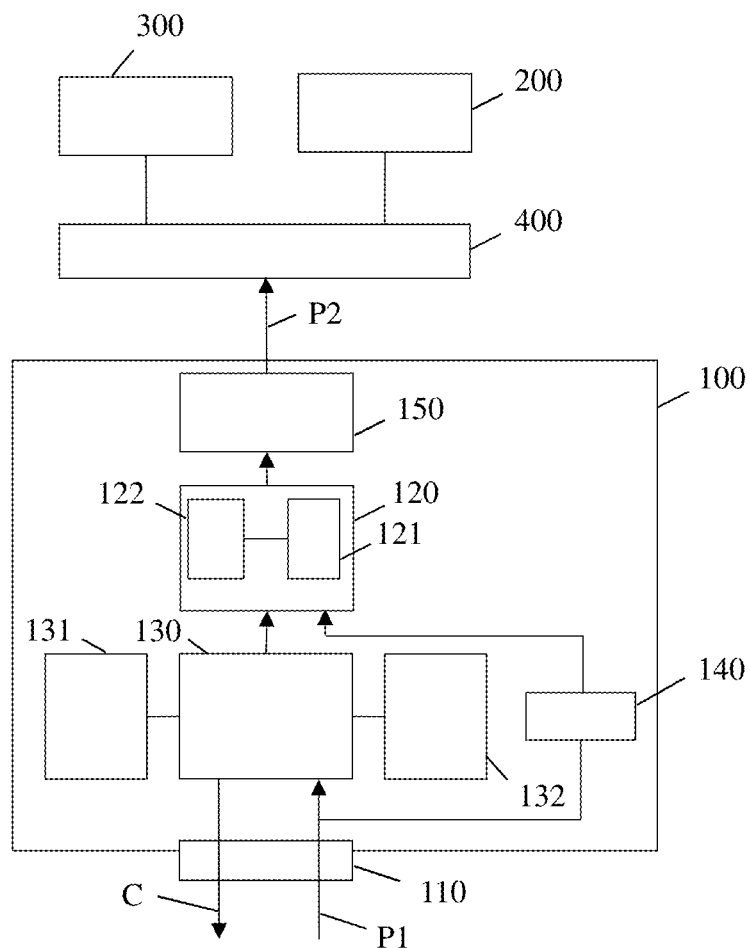
FIG. 1 shows a schematic block diagram of an embodiment of an I/O controller for a processing unit.

In view of the above, it is an aspect of the present invention embodiments to provide an I/O controller with improved performance in spite of little exploitable spatial locality of the addresses in the DMA requests from attached I/O devices.

According to an embodiment of a first aspect, an I/O (Input/Output) controller for a processing unit is suggested. The I/O controller is coupled to the processing unit and to a memory. The I/O controller includes an I/O link interface, an address translation unit, an I/O packet processing unit, and a prefetcher. The I/O link interface is configured to receive data packets having virtual addresses. The address translation unit includes an address translator for translating received virtual addresses into real addresses by translation control entries and a cache allocated to the address translator for caching a number of the translation control entries. The I/O packet processing unit is configured to check the data packets received at the I/O link interface and to forward the checked data packets to the address translation unit. The prefetcher is configured to forward address translation prefetch information from a data packet received at the I/O link interface to the address translation unit. Further, the address translator is configured to fetch the translation control entry for the data packet by means of the address translation prefetch information from the allocated cache or, if the translation control entry is not available in the allocated cache, from the memory.

Therefore, translations from virtual addresses to real addresses may be pre-fetched and performance may be improved by reducing address translation miss stalls in the address translation unit in spite of little spatial locality of the addresses in the requests from I/O devices.

In an embodiment of the I/O controller, the I/O packet processing unit is coupled between the I/O link interface and the address translation unit, and the prefetcher is arranged in parallel to the I/O packet processing unit In a further embodiment, the prefetcher is configured to forward a Requestor ID (RID) and a virtual address as the address translation prefetch information from the data packet received at the I/O link interface.

In a further embodiment, the address translation unit further includes a Requestor ID translation unit (RTU) for translating the Requestor ID (RID) into a virtual domain by means of a RID translation entry (RTE) including a translation table base address for translating at least a part of the virtual address into a translation control entry.

In a further embodiment, the Requestor ID translation unit is configured to fetch the RID translation entry (RTE) by means of the Requestor ID (RID) from the cache allocated to the request translation unit or, if the RID translation entry is not available in the allocated cache, from the memory.

In a further embodiment, the address translation unit further includes a bit selection unit for selecting a first parameter indicating the I/O page size and a second parameter indicating translation control entry table size index bits from the received virtual address.

In a further embodiment, the Requestor ID translation unit is configured to control the bit selection unit in dependence on the actual received Requestor ID.

In a further embodiment, the address translator is configured to fetch the translation control entry by a single level translation scheme or by a multi-level translation scheme by using a translation table index which is generated by the first parameter and the second parameter and by using the translation table base address.

In a further embodiment, the address translation unit is configured to serve two types of requests including demand requests for data packets from the I/O packet processing unit and prefetch requests from the prefetcher.

In a further embodiment, the address translator is configured to update a last recently used (LRU) position of the translation control entries (TCE) in the cache allocated to the address translator for a TCE miss of a prefetch request, for a TCE hit of a prefetch request, for a TCE miss of a demand request and not for a TCE hit of a demand request.

In a further embodiment, for a TCE miss of a demand request, the address translator is configured to allocate a translation slot in the cache and to update the last recently used (LRU) position.

In a further embodiment, the cache allocated to the address translator includes separate demand slots for demand lookups triggered by demand requests and prefetch slots for prefetch lookups triggered by prefetch requests.

In a further embodiment, the cache allocated to the address translator includes a first region of slots that is exclusively used for prefetch lookups and a second region of slots that is shared by prefetch lookups and demand lookups triggered by demand requests, the ratio of allocations into the different regions being adapted to reduce the allocation in the shared region compared to the actual number of slots to guarantee recoverability into a non-thrashing prefetch state.

In a further embodiment, an allocation ratio is reset to the actual ratio of slots in the shared and exclusive region if a demand miss TCE allocation logic detects a stable non-demand miss state.

In a further embodiment, the cache allocated to the address translator is divided into two regions or ranges, the two regions being independent from each other and one range being used for read allocations and one for write allocations.

In a further embodiment, the read and write range can be implemented without separation of demand and prefetch requests or using one of the above mentioned cache thrashing avoidance mechanisms.

In a further embodiment, the cache allocated to the address translator includes a first region of slots that is exclusively used for prefetch read lookups triggered by prefetch read requests, a second region of slots that is shared by prefetch read lookups and demand read lookups triggered by demand read requests, a third region of slots that is exclusively used for prefetch write lookups triggered by prefetch write requests, and a fourth region of slots that is shared by prefetch write lookups and demand write lookups triggered by demand write requests.

In a further embodiment, the cache allocated to the address translator includes a first region of slots that is exclusively used for read lookups triggered by prefetch read requests, a second region of slots that is exclusively used for demand read lookups triggered by demand read requests, a third region of slots that is exclusively used for prefetch write lookups triggered by prefetch write requests, and a fourth region of slots that is exclusively used for demand write lookups triggered by demand write requests.

In a further embodiment, the prefetcher includes a read queue for prefetched read requests, a write queue for prefetched write requests, and an arbiter for arbitrating the read queue and the write queue.

In a further embodiment, the prefetcher further includes a read counter coupled to the read queue for keeping track of a defined read prefetch distance and delaying further read prefetches if the defined read prefetch distance reaches a configurable threshold, and a write counter coupled to the write queue for keeping track of a defined write prefetch distance and for delaying further write prefetches if the defined write prefetch distance reaches a configurable threshold, wherein the arbiter is configured to arbitrate the read queue and the write queue in dependence on the read counter and the write counter.

In a further embodiment, the thresholds are adapted to the number of cache slots available for prefetch requests in the cache ranges allocated to the address translator.

In a further embodiment, the threshold is adapted to the actual ratio of slots used for prefetches in a shared cache implementation based on detection of a stable non-demand miss state by the TCE allocation logic.

In a further embodiment, the number of queue slots of the read queue and the number of issued read prefetches are combined with credit information for read from the I/O packet processing unit to form a link read (non-posted) header credit information.

In a further embodiment, the number of queue slots of the write queue and the number of issued write prefetches are combined with the credit information for write from the I/O packet processing unit to form a link write (posted) header credit information.

The respective means, e.g., the prefetcher or the address translator, may be implemented in hardware or in software. If the means are implemented in hardware, it may be embodied as a device, e.g., as a computer or as a processor or as a part of a system, e.g., a computer system. If the means are implemented in software it may be embodied as a computer program product, as a function, as a routine, as a program code or as an executable object.

Any embodiment of the first aspect may be combined with any embodiment of the first aspect to obtain another embodiment of the second aspect.

According to an embodiment of a second aspect, a method for operating an I/O controller for a processing unit is suggested. The I/O controller is coupled to the processing unit and to a memory. The I/O controller includes an I/O link interface, an address translation unit, an I/O packet processing unit, and a prefetcher. The I/O link interface is configured to receive data packets having virtual addresses. The address translation unit includes an address translator for translating received virtual addresses into real addresses by translation control entries and a cache allocated to the address translator for caching a number of the translation control entries. The I/O packet processing unit is configured to check the data packets received at the I/O link interface and to forward the checked data packets to the address translation unit. The method includes forwarding address translation prefetch information from a data packet received at the I/O link interface to the address translation unit. Moreover, the method includes fetching the translation control entry for the data packet by means of the address translation prefetch information from the allocated cache or, if the translation control entry is not available in the allocated cache, from the memory.

According to an embodiment of a third aspect, the invention relates to a computer program comprising a program code for executing the method of the second aspect for operating an I/O controller when run on at least one computer.

In the following, exemplary embodiments of the present invention are described with reference to the figures.

Referring now to FIG. 1, a schematic block diagram of an embodiment of an I/O controller 100 for a processing unit 200 is depicted. The I/O controller 100 may be a PCI Express Host Bridge (PHB). The I/O controller 100 is coupled to the processing unit 200, e.g., a central processing unit (CPU), and to a memory 300, e.g., main memory. For this coupling, a processor bus 400 is provided.

The I/O controller 100 has an I/O link interface 110 adapted to receive data packets P1 having virtual addresses, an address translation unit 120, an I/O packet processing unit 130 coupled between the I/O link interface 110 and the address translation unit 120 and a processor bus unit (PBU) 150 adapted to transmit data packets P2 having real addresses, wherein the PBU 150 couples the I/O controller 100 to the processor bus 400. Further, the I/O packet processing unit 130 which is for example embodied as a TLDLP (transaction level/data level protocol) unit 130 has an allocated replay buffer 131 and an allocated receive buffer 132, for instance.

The TLDLP unit 130 is adapted to check the data packets received at the I/O link interface 110 and to forward the checked data packets to the address translation unit 120. The address translation unit 120 has an address translator 121 for translating received virtual addresses into real addresses RA by use of translation control entries (TCEs) and a cache 122 allocated to the address translator 121 for caching a number of the translation control entries (TCEs).

Further, the I/O controller 100 of FIG. 1 has a prefetcher 140 which is coupled between the address translation unit 120 and the I/O link interface 110. Further, the prefetcher 140 is arranged in parallel to the I/O packet processing unit 130. In this regard, the prefetcher 140 is adapted to bypass the TLDLP unit 130 regarding address translation prefetch information. In detail:

In particular, the TLDLP unit 130 handles all the Peripheral Component Interconnect Express (PCIe) link related packet processing. Therefore, it communicates available header and data credits C to the connected switch or device, both for posted, i.e., DMA write, and non-posted, i.e., DMA read, operations. It is responsible for checking DLP and TLP packet correctness and queuing TLPs for processing in the address translation unit 120, e.g., a PCIe Translation unit (PTU). The PTU 120 may be responsible for address translation by use of translation control entries TCEs either located in the cache 122 or by fetching translation control entries TCEs from address translation tables in main memory 300. After address translation in the PTU 120, received data is written and requested data read from the coherent processor bus 400 using the processor bus unit (PBU) 150.

As the PTU unit 120 may encounter translation misses in its cache 122, the major queuing of PCIe packets is done in the TLDLP unit 130. This may have the disadvantage that the PTU 120 sees the addresses it has to translate only at a late point in time and if there is a cache miss, it will stall consecutive TLPs according to the PCIe ordering rules until the translation is resolved.

To avoid this, the present I/O controller 100 uses the prefetcher 140. The prefetcher 140 is adapted to forward address translation prefetch information from the data packet P1 received at the I/O link interface 110 to the address translation unit 120. Then, the address translator 121 of the address translation unit 120 may be configured to fetch the translation control entry TCE for the data packet P1 by means of the address translation prefetch information from the allocated cache 122 or, if the translation control entry TCE is not available in the allocated cache 122, from the memory 300. As a result, the translation from virtual address to real address RA may be prefetched.

For the example of TLDLP, the address translation prefetch information may be embodied by the Requestor ID (RID) and the PCIe address. Therefore, the Requestor ID and PCIe address pair from the TLP header may be taken directly from the I/O link interface 110, e.g., PIPE interface, and fed into the PTU 120 in advance so that the latter may prefetch the necessary translations. The PTU 120 may thus serve two types of requests: demand requests for actual packets from the TLDLP 130, and prefetch requests from the prefetcher 140.

Figure 2:
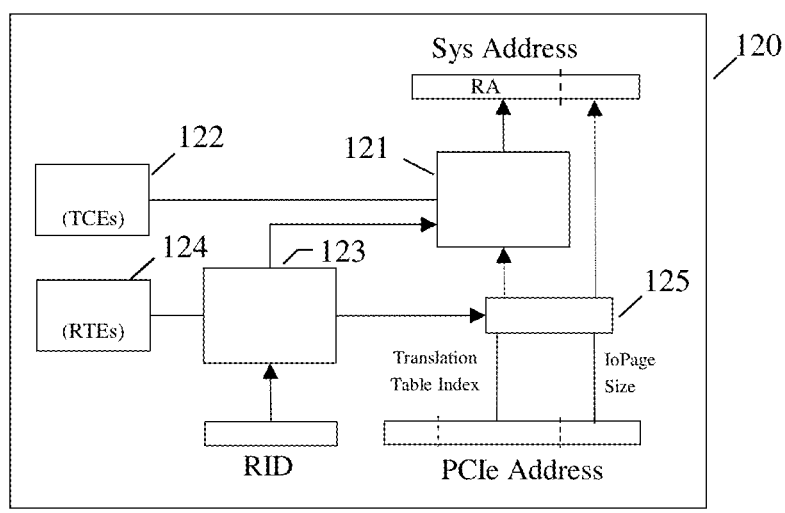
FIG. 2 shows a schematic block diagram of an embodiment of an address translation unit of the I/O controller of FIG. 1.

FIG. 2 shows a schematic block diagram of an embodiment of an address translation unit 120 of the I/O controller 100 of FIG. 1.

The prefetcher 140 as shown in FIG. 1 is adapted to forward a Requestor ID (RID) and a virtual address as the address translation prefetch information from the data packet received at the I/O link interface 110 to the address translation unit 120 as shown in FIG. 2. Taking the example of PCIe, for address translation in PCIe two lookups are needed: first the Requestor ID (RID) in the PCIe packet needs to be translated into a virtual domain context using RID translation entries (RTEs). This may require a cache 124 as a single PCIe bus may have up to 64 k RIDs used by attached devices. To minimize area requirements, the full table may be stored in main memory 300 and only a small set of RTEs cached in the cache 124. An advantage for RTE caching that makes it easier to handle compared with PCIe address translation is that the RIDs used by a device have more temporal locality than the addresses.

The address translation unit 120 therefore includes a Requestor ID translation unit 123 for translating the Requestor ID (RID) into a virtual domain using RID translation entries (RTEs) including a translation table base address for translating at least a part of the virtual address into a translation control entry (TCE) index. The Requestor ID translation unit 123 may be configured to fetch the RID translation entry (RTE) by means of the Requestor ID (RID) from a cache 124 allocated to the Requestor ID translation unit 123 or, if the RID translation entry RTE is not available in the allocated cache 124, from the memory 300. The address translation unit 120 further includes a bit selection unit 125 for selecting a first parameter indicating an I/O page size and a second parameter indicating translation control entry table size index bits from the received virtual address. The request translation unit 123 may be configured to control the bit selection unit 125 in dependence on the actual received Requestor ID RID.

Having the virtual domain from the RID translation, the actual PCIe address may be translated into a system real address (Sys Address). The address translation information is contained in translation entries, called translation control entries (TCEs). The translation control entries (TCEs) have at least information for the real address (RA) for the translation as well as access control information (AC) to define whether read and/or write accesses are allowed for this translation.

There are three variables that may vary from virtual domain to virtual domain—the I/O page size, the number of TCE table levels and the TCE table size. The I/O page size defines how large an I/O page is, i.e., how many lower address bits from the PCIe Address are used unchanged in the system real address. The TCE table size defines the size of the TCE table and therefore how many TCE entries are present in the table and how many bits from the PCIe Address are taken for TCE indexing. Together with the I/O page size, this defines the address range starting at PCIe address 0x0 that a device may use as virtual address space. There is a third possible configuration option, the number of TCE table levels. The maximum PCIe address available to the device is thus:

$$AddressBitMax = TceTableLevels * TceTableSizeIndexBits + IoPageSizeBits$$

This information may be used to select the right bits from the PCIe address by the bit selection unit 125.

Figure 3:
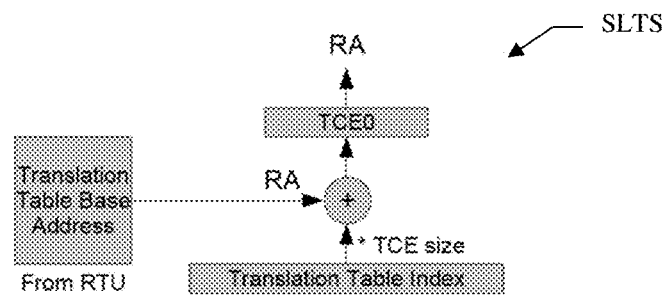
FIG. 3 shows an example for a single level translation scheme.
Figure 4:
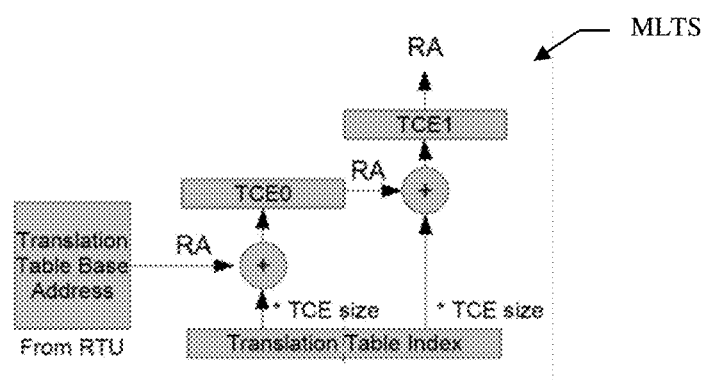
FIG. 4 shows an example for a multi-level translation scheme.

Furthermore, the address translator 121 may be configured to fetch the translation control entry TCE by a single level translation scheme SLTS or by a multi-level translation scheme MLTS by using a translation table index which is generated by the first parameter and the second parameter and by using the translation table base address. In this regard, FIG. 3 shows an example for single level translation scheme SLTS and FIG. 4 shows an example for a multi-level translation scheme MLTS. For SLTS, single-level tables have the advantage that they may offer better performance as only a single lookup is needed for a cache miss. Multi-level tables, on the other hand, are more space-efficient for sparsely populated translation tables. In both cases, the I/O controller 100, e.g., the PHB, may need information on the location of the root table for the first TCE fetch. The root table address can either be stored in the PHB 100 itself if, e.g., the number of supported virtual domains is limited or it can be fetched and cached with the RID translation lookup as data affiliated to the RID translation.

In the following, an assumption is that caches smaller or on the order of the link header credits are used. Typical PHBs e.g., advertise between 16 to 32 posted and non-posted header credits. The data buffer dimensioning for posted headers may be such that it can bridge two cache misses with worst-case translation data lookup latency. It is therefore dimensioned to allow full line speed with a single-table translation table with RID and TCE translation misses. For line-speed in multi-level translation setups, the data buffers as well as the header credits may need to be increased accordingly. 512 posted data credits equivalent to an 8 k receive buffer would result roughly in a 500 ns delay for a packet from entering the TLDLP until being seen by the PTU 120 for a x16 Gen3 PCIe link if the receive buffers are completely filled. This allows on average 250 ns for a RID and a TCE lookup respectively which is adequate also for larger server systems with deep memory request queues.

Using the prefetcher 140 parallel to the TLDLP unit 130, this time can be used to prefetch the address translation from main memory 300 using the processor bus 400, such that the translation is available when the actual request arrives in the PTU 120. The translation prefetch mechanism extracts the RID and PCIe address directly after the link-interface 110 at the interface to the TLDLP block—e.g., in form of a PIPE interface—and feeds this data into the translation unit 120 so that, if needed, it can already start the necessary fetches such that the data is ready in the cache when the actual request arrives from the TLDLP unit 130.

Moreover, the address translator 121 is configured to update a last recently used (LRU) position of the translation control entries TCE in the cache 122 allocated to the address translator 121 for a TCE miss of a prefetch request, for a TCE hit of a prefetch request, for a TCE miss of a demand request and not for a TCE hit of a demand request. The reason that prefetching needs to be adapted to PCIe requirements are explained in the following with reference to FIGS. 5 to 7.

Figure 5:
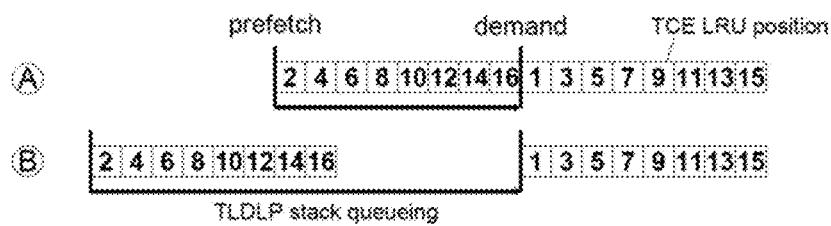
FIG. 5 shows an example for conventional TCE hit and allocation LRU update.
Figure 6:
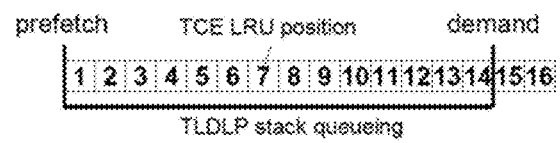
FIG. 6 shows an example for prefetch-only TCE hit LRU update.
Figure 7:
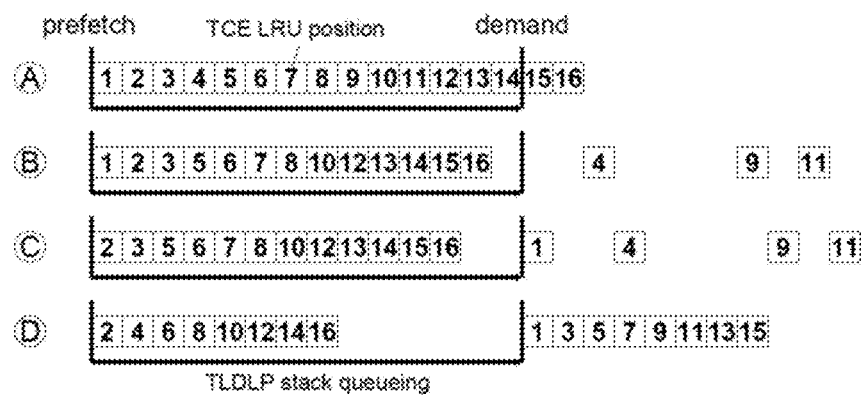
FIG. 7 shows an example for prefetch-only TCE hit LRU update with prefetch misses.

In this regard, FIG. 5 shows an example for conventional TCE hit and allocation LRU update, FIG. 6 shows an example for prefetch-only TCE hit LRU update, and FIG. 7 shows an example for prefetch-only TCE hit LRU update with prefetch misses. The first operation in using prefetching in an I/O controller environment is moving the reference point for the translation caches to the pre-TLDLP order, opposed to the post-TLDLP order, where it is without prefetching. This means that, in the normal case, only prefetch requests allocate new translations in the translation caches or update the LRU state of the cache in case of a translation hit. Actual demand requests for the final translation do not update the LRU, if the translation is found in the cache. Only if a translation miss is encountered for a demand request, a translation slot is allocated in the cache and the LRU is updated. In the prefetch oriented environment, this case only happens when a prefetch request is lost due to resource limitations. Depending on whether it is feasible based on the LRU implementation, demand requests may also not be inserted at the most recently used position, but at a position closer to the least recently used position to reduce thrashing effects.

The reason for not updating the LRU during demand hits is shown in the FIGS. 5 to 7, where the numbered squares represent TLDLP packets that have different addresses and therefore require different translations, i.e., their own TCE, in the cache. The numbers in the squares represent the LRU position—1 being the most recently used, 16 being the least recently used (LRU).

If the LRU state is updated by both the prefetch and demand (PTU) lookups, and considering that there is a constant flow of incoming and processed packets, the LRU update for demand lookups creates a history of translations in the cache that are not needed anymore in the near future but take up slots that would be needed for prefetch requests—uneven LRU positions in FIG. 5.

If there are more requests queued in the TLDLP stack than prefetch requests that can be allocated with slots, as shown in FIG. 5, all prefetch requests are replaced by new translations before they reach the PTU 120. This state may be called cyclic cache thrashing and the effect is that all translations are fetched twice, once for the prefetch, and once for the demand, which not only renders the prefetch useless, but also doubles the bandwidth needed for fetching translation data from system memory. Considering same-sized packets and an address translation miss per packet, the critical queuing in the TLDLP 130 is half the number of the cache size. In the shown case, the cyclic thrashing state is entered when there are more requests queued in the TLDLP unit than half of the TCE cache slots (8). Not updating a TCE hit in the PTU during the demand request phase avoids the additional demand fetch TCE history. The dimensioning of the TCE cache can then be adapted such that the LRU element in the cache is replaced shortly after it was used for its demand lookup in the PTU as shown in FIG. 6.

The cyclic thrashing state may also be entered if only prefetch requests allocate slots and update the LRU state in the normal case because of imperfectness of the LRU implementation or because of resource limitations that require drops of prefetch requests. In those cases, the PTU needs to allocate a slot in the cache for the translation miss that creates a small additional history of post-PTU TCEs. Depending on the number of requests queued and the cache size, this leads to cyclic thrashing once the connection between prefetched TCEs and the PTU lookup is lost as shown in FIG. 7B. Without further precautions, the cyclic thrashing state is a stable state. Therefore, once state B in FIG. 7 is entered and there is no reduction in request rate, the system will fall into the stable thrashing state D.

For getting out of the cyclic thrashing state, the number of requests queued in the TLDLP unit 130 needs to reduce to a point where the last prefetched TCE is a hit for a demand lookup, this situation is the one shown in FIG. 5, part A. The problem of the cyclic thrashing state is that it considerably decreases bandwidth because the PTU 120 stalls frequently, in the worst case once for every packet. This reduces the link bandwidth which in turn further increases the request queuing if the connected devices do not decrease their request rate.

As described above, the destructive cyclic thrashing state, as shown in part D of FIG. 7, can only be left when the queuing in the TLDLP stack 130 decreases to where the prefetched TCEs "reach" are hit by a demand request.

The cache allocation may be adapted such that it can recover into a non-thrashing state. One way to prevent this is to completely separate demand and prefetch slots in the cache. Another way is to have a dedicated pool of slots only for prefetches and one pool that is shared between prefetches and demand lookups.

Figure 8:
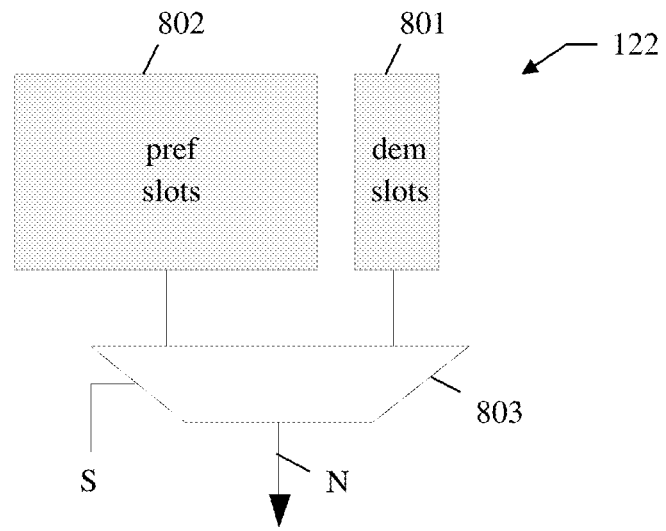
FIG. 8 shows a schematic block diagram of a first embodiment of the cache allocated to the address translator.

The following figures show embodiments of the cache 122 allocated to the address translator 121 of the address translation unit 120. In this regard, FIG. 8 shows a schematic block diagram of a first embodiment of the cache 122 allocated to the address translator 121. The cache 122 of FIG. 8 includes separate demand slots 801 for demand lookups triggered by demand requests and prefetch slots 802 for prefetch lookups triggered by prefetch requests. Further, the cache 122 comprises a multiplexer 803. The multiplexer 803 is controlled from the address translator 121 by a control signal S and outputs the slot number N that is to be used for the next TCE allocation from the respectively requested slot pool 801, 802.

Figure 9:
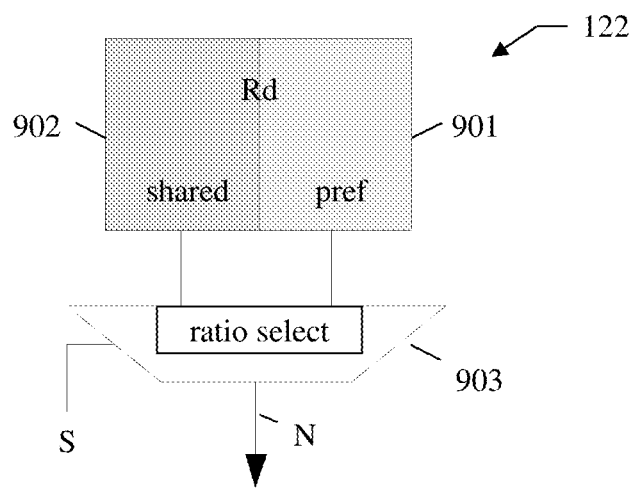
FIG. 9 shows a schematic block diagram of a second embodiment of the cache allocated to the address translator.

The implementation of FIG. 8, in particular because of having separate slots for demand look-ups (prefetch misses) may be advantageous, if there are sufficient slots to have one or almost one slot per header credit and the LRU can be implemented such that it has sufficient accuracy. It may allow for allocating only a few slots for demand requests, in particular as many as can be worked on in parallel in the PTU 120, and for a faster recovery because no prefetches are potentially thrashed out. This is also advantageous to simplify the LRU selection mechanism, especially if the ratio of prefetch slots to demand slots is increasing. Another way is to implement the cache 122 is shown in FIG. 9. The cache 122 of FIG. 9 includes a first region 901 of slots that is exclusively used for prefetch lookups and a second region 902 of slots that is shared by prefetch lookups and demand lookups triggered by demand requests.

Thus, one part 901 of the slots are exclusive for prefetch use, the other part 902 is shared between prefetch and demand allocations. The number of prefetches issued from the prefetch queue may be adapted to the according number of available slots. For example 16 slots per side can be divided into either an 8 slot shared region 902 and an 8 slot exclusive region 901 that can recover reliably from any number of prefetch misses when prefetching up to 12 translations. With a simple binary LRU mechanism, the slot allocation then needs to be such that the shared to exclusive region is selected in a ratio of 1:2 for prefetch allocations. Using a prefetch miss detection mechanism, e.g., by keeping track of the number of demand misses over the last 12 lookups, the allocation ratio may be set to 1:1 when there are no misses. This reduces the risk of replacing prefetched translations before they are actually used which may occur due to the imperfectness of the binary LRU. The mixed region 902 may be sized according to the number of translations that can be resolved in parallel by the PTU 120. Both implementations of FIGS. 8 and 9 allow the cache 122 to recover from translation control entry TCE prefetch misses.

Figure 10:
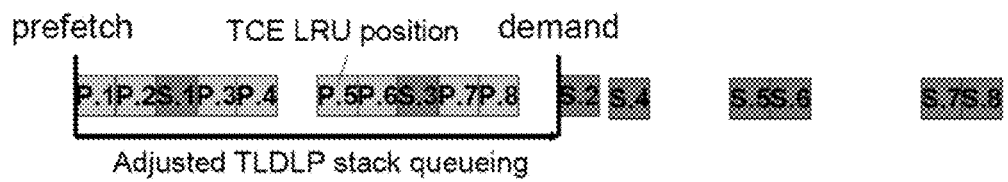
FIG. 10 shows an example for prefetch and shared space cache slot allocation.

Further, FIG. 10 shows an example for prefetch and shared space cache slot allocation with a ratio of 2:1 between the prefetch and shared region for prefetch requests, wherein P in FIG. 10 designates prefetch space cache slot allocation and S designates shared space cache slot allocation. For the shown example, 4 slots in the shared space are needed for prefetches. Two more slots will be required for demand lookups to resolve the two missed translations for requests queued in the TLDLP, after position P.4 and P.8. For recovery from this situation, the shared region thus needs 4 slots for prefetch requests plus two for demand requests, which is smaller than the available 8. Thus, without further prefetch misses, the prefetch mechanism would be hit-stable again starting from packet P.4.

Furthermore, a consequence of using the pre-TLDLP ordered packets from the link in combination with the difference in packet sizes is that the order is no longer the same order as may be seen by the PTU 120. This may mainly be a result of resource limitations in the processor bus unit 150 and the difference in MTU size for memory read and write operations. Therefore, writes will traverse the northbound path faster than read requests, so prefetched write address translations have much better locality in the PTU address translation cache 122 compared with memory read operations. So a further aspect in PCIe address translation handling is also the difference in temporal locality between prefetching the address translation into the cache and use of the translation for reads and writes.

This difference has two main root causes. The first is that read requests may be supported up to a size of 4 k. Writes, on the other hand, may be limited to smaller sizes by limitation of the link MTU by the PCIe host bridge. Smaller sizes are mainly used to improve the capability to issue reads in-between transfers of a larger write. It also contributes to enabling root complexes with smaller receive buffers. On the response side, 4 k read requests are split up into smaller transfers according to the MTU size of the attached device or switch. The second is that reads usually encounter more ordering limitations than writes because of the PCI Express ordering rules.

Figure 11:
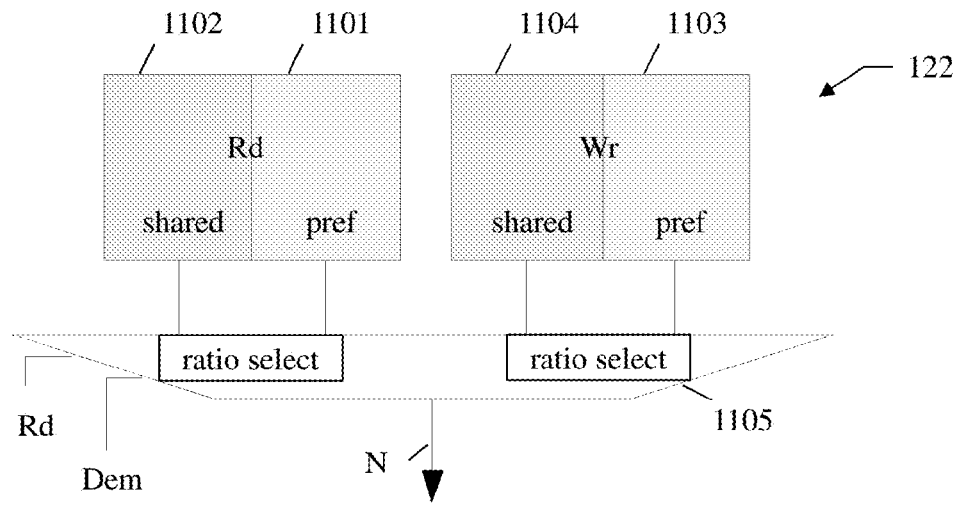
FIG. 11 shows a schematic block diagram of a third embodiment of the cache allocated to the address translator.

One particularity of I/O traffic is that the addresses of DMA requests for the different directions are usually direction-specific, i.e., receive buffers use different translations than send buffers. In this regard, the present invention may take advantage of the special address characteristics of I/O traffic. In this regard, FIG. 11 shows a schematic block diagram of a third embodiment of the cache 122 allocated to the address translator 121. The cache 122 of FIG. 11 includes a first region 1101 of slots that is exclusively used for prefetch read lookups triggered by prefetch read requests, a second region 1102 of slots that is shared by prefetch read lookups and demand read lookups triggered by demand read requests, a third region 1103 of slots that is exclusively used for prefetch write lookups triggered by prefetch write requests, and a fourth region 1104 of slots that is shared by prefetch write lookups and demand write lookups triggered by demand write requests.

The multiplexer 1105 of FIG. 11 is controlled by an Rd signal indicating a read request and a Dem signal indicating a demand request. Using the two signals Rd and Dem and taking into account the prefetch allocation ratio selector, the multiplexer 1105 may select the respective one of the regions 1101 to 1104 for outputting the slot number N that is to be used for the next TCE allocation. For example, if Rd is asserted and Dem is not asserted, region 1101 or region 1102 is selected by the multiplexer 1105 based on the current ratio selector state.

Figure 12:
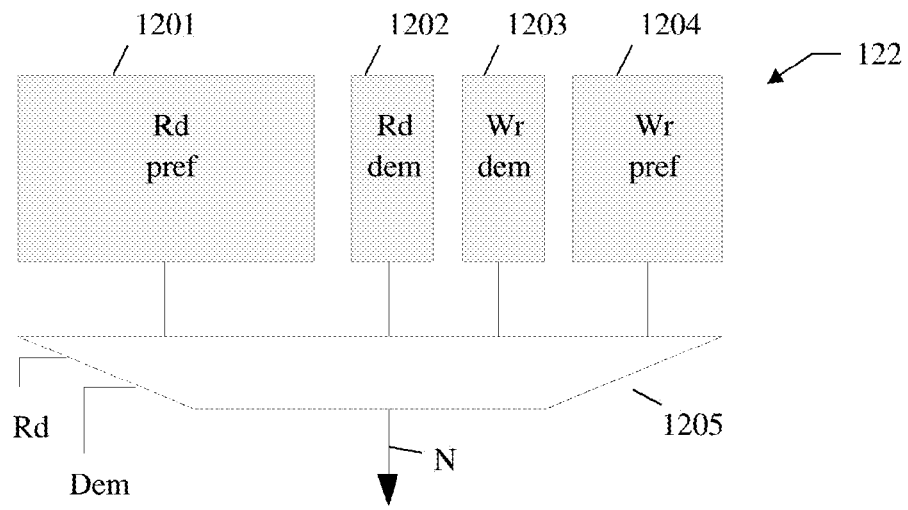
FIG. 12 shows a schematic block diagram of a fourth embodiment of the cache allocated to the address translator.

A further implementation for the cache 122 is shown in FIG. 12. The cache 122 of FIG. 12 includes a first region 1201 of slots that is exclusively used for read lookups triggered by prefetch read requests, a second 1202 region of slots that is exclusively used for demand read lookups triggered by demand read requests, a third region 1203 of slots that is exclusively used for prefetch write lookups triggered by prefetch write requests, and a fourth region 1204 of slots that is exclusively used for demand write lookups triggered by demand write requests.

Also, the multiplexer 1205 of FIG. 12 is controlled by an Rd signal indicating a read request and a Dem signal indicating a demand request. Using the two signals Rd and Dem, the multiplexer 1205 may select the respective one of the regions 1201 to 1204. In this case, all Rd and Dem signal combinations select a different slot pool. Rd without Dem selects the Rd prefetch slot pool 1201, Rd with Dem the Rd demand slot pool 1202, no Rd and Dem the write demand slot pool 1203, and finally no Rd and no Dem the write prefetch pool 1204. So, for the example above, if Rd and Dem are asserted, always region 1202 is selected by the multiplexer 1205.

The number of demand slots may be adapted to the number of requests that can be in flight in the PTU 120. Advantageous is also a distribution of a few more read prefetch slots compared to write prefetch slots, such that work request descriptors—generally known as work queue elements (WQEs)—that are usually fetched by a device and then updated after completion, remain in the read space on the write update in case the TCE was not already cast out of the cache. Another possible implementation may allow moving or copying TCEs from read prefetch to write prefetch slots and/or vice versa.

Figure 13:
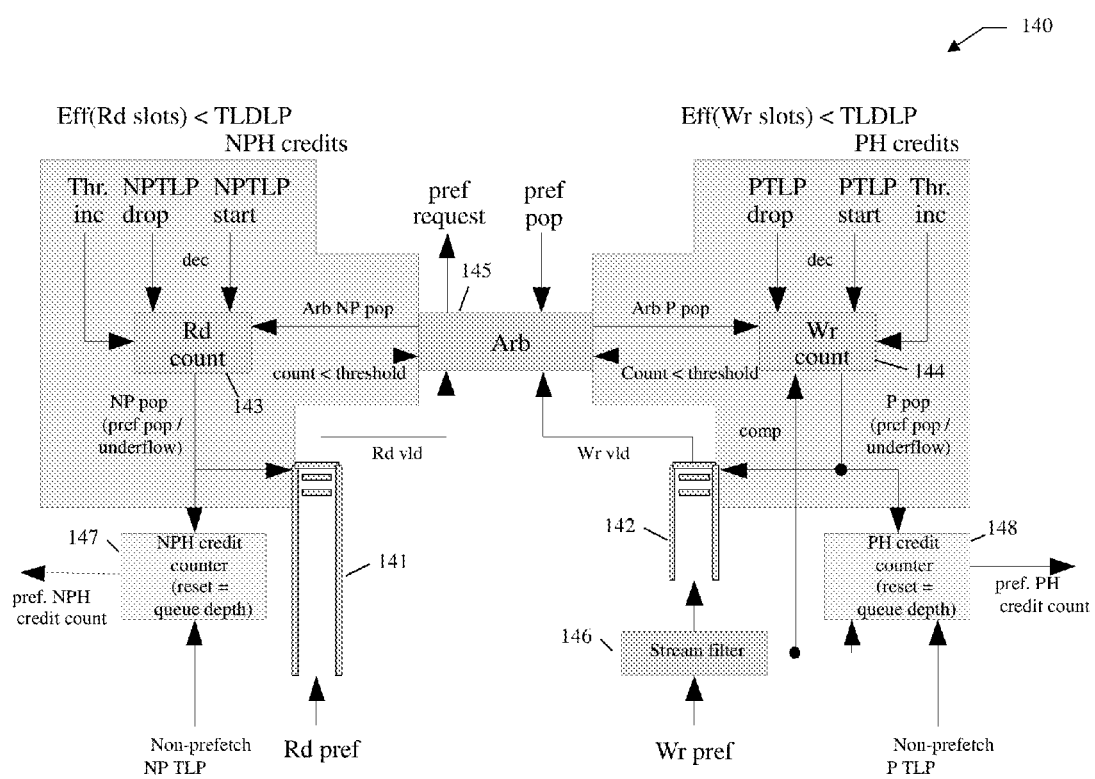
FIG. 13 shows a schematic block diagram of an embodiment of the prefetcher of the I/O controller of FIG. 1.

FIG. 13 shows a schematic block diagram of an embodiment of the prefetcher 140 of the I/O controller 100 of FIG. 1. The prefetcher 140 includes a read queue 141 for prefetch read requests Rd pref, a write queue 142 for prefetch write requests Wr pref, a read counter 143 coupled to the read queue 141 for keeping track of a defined read prefetch distance and delaying further read prefetches if the defined read prefetch distance reaches a configurable threshold in case the prefetch read slots in the cache 122 of FIG. 11 or FIG. 12 are less than the maximum expected read credit use of a connected device, a write counter 144 coupled to the write queue 142 for keeping track of a defined write prefetch distance and for delaying further write prefetches if the defined write prefetch distance reaches a configurable threshold in case that the prefetch write slots in the cache 122 of FIG. 11 or FIG. 12 are less than the maximum write credit of a connected device, and an arbiter 145 for arbitrating the read queue 141 and the write queue 142 in dependence on the read counter 143 and the write counter 144.

Thus, prefetcher 140 in parallel to the TLDLP 130 may be adapted to the separation of Rd (read) and Wr (write), therefore consisting of two queues 141, 142. There will be frequently writes going to consecutive addresses within the same I/O page and therefore using the same translation entry TCE. This is for example the case when a network device writes the payload of an Ethernet frame (1.5 k) into a receive buffer. To reduce the queue requirements, an optional write stream filter 146 may thus be used that filters out writes that hit the same translation entry.

In case that the cache size is much smaller than the number of headers, prefetch request run ahead limiting is required. As mentioned above, a counter for Rd 143 and (both directions have fewer effective slots than credits)/ or (only one side has fewer effective slots than credits) a counter for Wr 144 may then be used which keeps track of the current prefetch distance and that delays further prefetches if the prefetch distance reaches a configurable threshold. The according counts are increased when a new prefetch request is issued to the PTU 120 and decreased if a new TLP request is issued from the TLDLP 130 to the PTU 120 or if a TLP was dropped because of data link layer or transaction layer protocol errors.

In particular, the prefetch queuing is completely separate from the translation in the PTU 120. Therefore, the prefetcher 140 considers the worst-case scenarios for the number of TLPs it runs ahead, that is it considers a TCE miss for every prefetch. This is mainly due also to the fact that the prefetch queuing and the actual address translation in the PTU 120 are separated both from a space perspective and potentially also from a temporal perspective.

Therefore, hits in the TCE cache 122 may not be propagated back into the prefetcher as the latter may not determine when it needs to reduce the run ahead threshold again. The information about cache slots however may be used to increase the prefetch distance. That is, when a TCE cache 122 with a shared slot range detects that it is in a stable hitting state using afore mentioned prefetch miss detection mechanism, the run ahead threshold can be increased signaled by the Thr. inc. signal per direction accordingly and reduced again when misses are detected in the TCE cache.

The counter 143 increases the run ahead count with every Arb pop and decreases it when receiving an NPTLP start or drop from the TLDLP 130 to PTU 120 interface. The Arb pop is propagated to the queue to remove the first FIFO element. In case that the arbitration was delayed and the TLP arrives before the prefetch could be issued, in order to avoid underflow of the counter, the first, now useless element is removed from the queue with and undeflow-triggered pop.

To avoid overflowing of the queues and thus loosing prefetch requests, the number of queue slots and the number of prefetches that were successfully processed can be combined with the credit information C from the TLDLP stack 130. In other words, with reference to FIG. 14, the number of queue slots of the read queue 141 and the number of issued read prefetches are combined with credit information for reads from the I/O packet processing unit 130 to form a link read (non-posted) header credit information. In an analogous way, the number of queue slots of the write queue 142 and the number of issued write prefetches are combined with the credit information for writes from the I/O packet processing unit 130 to form a link write (posted) header credit information.

The queue pop signal can be used to increase the prefetch header credit count. The reset value of this counter is set to the number of slots on the prefetch queue. The maximum counter value is set to the same value as the header credit count of the TLDLP stack 130 such that they wrap around at the same time. The number of header credits announced to the attached device can then be selected such that the smaller counter value of the two is chosen. This may allow avoiding prefetch misses due to overflows of the prefetch queue.

Figure 14:
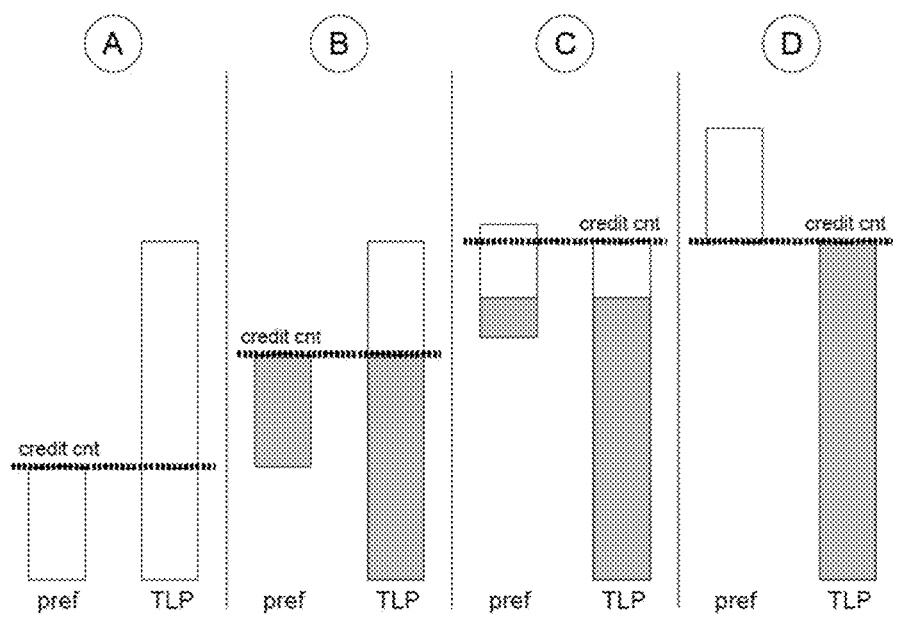
FIG. 14 shows an example for credit allocation.

Therefore, the header credit information may always reflect the number of slots available in the unit with fewest resources at the moment as shown exemplarily by FIG. 14 where part A shows a state where both queues (prefetch and I/O packet processing unit) are empty and the smaller (prefetch) credit count is sent to the attached I/O device. Part B shows the state where the credit limiter avoids prefetch misses, i.e., the I/O device credit count is limited by the prefetcher because of a full queue while there is space in the I/O packet processing unit 130. Finally, Part C and D are I/O packet processing unit 130 credit count limited with free queue slots both in the prefetcher 140 and the TLDLP stack 130 in Part C and an empty prefetch queue 140 and a full TLDLP stack 130 in Part D.

This scheme is especially efficient if the connected device is a switch. Therefore, the buffers of the external switch can be used to reduce backpressure to the devices and the output queuing in the switch allows for short turnaround times for using newly advertised header credits, thus also allowing efficient prefetching with short prefetch queues.

Figure 15:
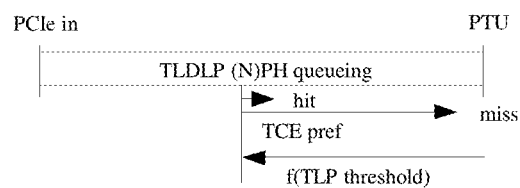
FIG. 15 shows an example for a prefetch start for a system with run-ahead limitation.
Figure 16:
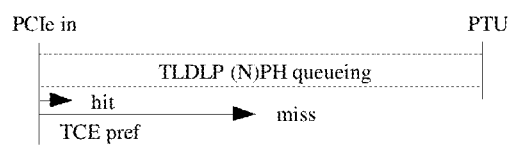
FIG. 16 shows an example for a prefetch start for a system without run-ahead limitation.

The difference between paced (using the Rd and/or Wr coun) and non-paced prefetching is shown in FIGS. 15 and 16. In this regard, FIG. 15 shows an example for a prefetch start for a system with run-ahead limitation, and FIG. 16 an example for a prefetch start for a system without run-ahead limitation. In the paced case in FIG. 15, the time a prefetch is issued is limited by the number of TLPs that can be issued without overflowing the TCE cache. In the non-paced case FIG. 16, TCE prefetches are issued immediately when they arrive in the unit.

Figure 17:
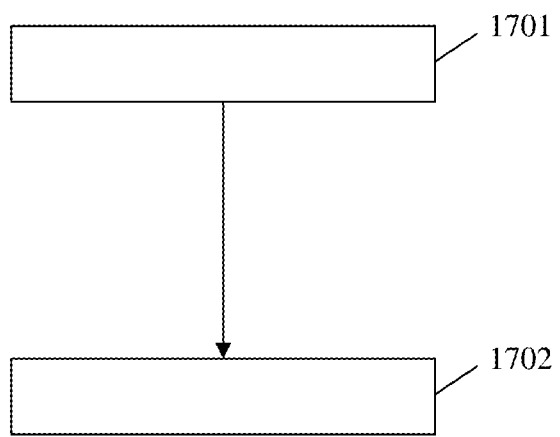
FIG. 17 shows an embodiment of a sequence for operating an I/O controller.
Figure 18:
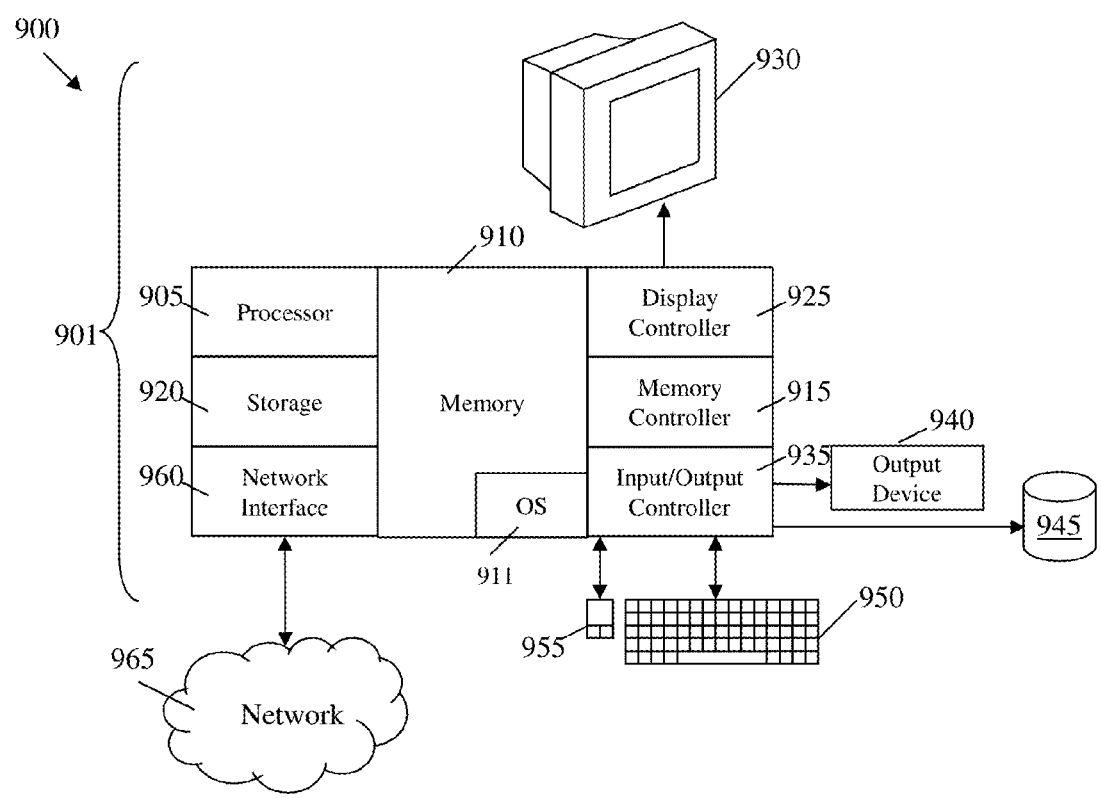
FIG. 18 shows a schematic block diagram of an embodiment of a system adapted for operating an I/O controller.

FIG. 17 shows an embodiment of a method for operating an I/O controller 100, exemplarily shown in FIG. 1. The I/O controller 100 is coupled to a processing unit 200 and to a memory 300, wherein the I/O controller 100 includes an I/O link interface 110 for receiving data packets having virtual addresses, an address translation unit 120 having an address translator 121 for translating received virtual addresses into real addresses by translation control entries TCEs and a cache 122 allocated to the address translator 121 for caching a number of the translation control entries TCEs, and an I/O packet processing unit 130 for checking the data packets received at the link interface 110 and for forwarding the checked data packets to the address translation unit 120. The method includes blocks 1701 and 1702.

In block 1701, address translation prefetch information is forwarded from a data packet P1 received at the I/O link interface 110 to the address translation unit 120. In block 1702, the translation control entry TCE for the data packet P1 is fetched by means of the address translation prefetch information from the allocated cache 122 or, if the translation control entry TCE is not available in the allocated cache 122, from the memory 300.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one or all of the operations in FIG. 17 may be implemented in software, as an executable program, the latter executed by suitable digital processing devices. More generally, embodiments of the present invention may be implemented wherein general-purpose digital computers, such as personal computers, workstations, etc., are used.

For instance, the system 900 depicted in FIG. 9 schematically represents a computerized unit 901, e.g., a general-purpose computer. In exemplary embodiments, in terms of hardware architecture, as shown in FIG. 9, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 may embody the I/O controller 100 of FIG. 1. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the methods as described herein (e.g., FIG. 17), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 7 or 8) are implemented in software, the methods may be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for operating an I/O controller coupled to a processing unit and to a memory, wherein the I/O controller includes an I/O link interface for receiving data packets having virtual addresses, an address translation unit having an address translator for translating received virtual addresses into real addresses by translation control entries and a cache allocated to the address translator for caching a number of the translation control entries, and an I/O packet processing unit for checking the data packets received at the link interface and for forwarding the checked data packets to the address translation unit, the method comprising:

forwarding, with a prefetcher, address translation prefetch information from a data packet received at the I/O link interface to the address translation unit; and fetching the translation control entry for the data packet by means of the address translation prefetch information from the allocated cache or, if the translation control entry is not available in the allocated cache, from the memory, wherein the address translation unit is configured to serve two types of requests including demand requests for data packets from the packet processing unit and prefetch requests from the prefetcher.

2. The method of claim 1, wherein the I/O packet processing unit is coupled between the I/O link interface and the address translation unit, and the prefetcher is arranged in parallel to the I/O packet processing unit.

3. The method of claim 1, wherein the prefetcher is configured to forward a Requestor ID (RID) and a virtual address as the address translation prefetch information from the data packet received at the I/O link interface.

4. The method of claim 3, wherein the address translation unit further includes a request translation unit configured to translate the Requestor ID (RID) into a RID translation entry (RTE) including a translation table base address for translating at least a part of the virtual address into a translation control entry (TCE) index.

5. The method of claim 4, wherein the Requestor ID translation unit is configured to fetch the RID translation entry by means of the Requestor ID from a cache allocated to the request translation unit or, if the RID translation entry is not available in the allocated cache, from the memory.

6. The method of claim 1, wherein the address translation unit further includes a bit selection unit configured to select a first parameter indicating I/O page size and a second parameter indicating translation control entry table size index bits from the received virtual address.

7. The method of claim 6, wherein the request translation unit is configured to control the bit selection unit in dependence on the actual received Requestor ID.

8. The method of claim 6, wherein the address translator is configured to fetch the translation control entry by a single level translation scheme (SLTS) or by a multi-level translation scheme (MLTS) by using a translation table index which is generated by the first parameter and the second parameter and by using the translation table base address.

9. The method of claim 1, wherein the address translator is configured to update a last recently used (LRU) position of the translation control entries in the cache allocated to the address translator for a TCE miss of a prefetch request, for a TCE hit of a prefetch request, for a TCE miss of a demand request and not for a TCE hit of a demand request.

10. The method of claim 9, wherein, for a TCE miss of a demand request, the address translator is configured to allocate a translation slot in the cache and to update the last recently used position.

11. The method of claim 1, wherein the cache allocated to the address translator includes separate demand slots for demand lookups triggered by demand requests and prefetch slots for prefetch lookups triggered by prefetch requests.

12. The method of claim 1, wherein the cache allocated to the address translator includes a first region of slots that is exclusively used for prefetch lookups and a second region of slots that is shared by prefetch lookups and demand lookups triggered by demand requests, the ratio of allocations into the different regions being adapted to reduce the allocation in the shared region compared to the actual number of slots to guarantee recoverability into a non-thrashing prefetch state.

13. The method of claim 12, wherein an allocation ratio is reset to the actual ratio of slots in the shared and exclusive region, if a demand miss TCE allocation logic detects a stable non-demand miss state.

14. The method of claim 1, wherein the cache allocated to the address translator is divided into two regions, the two regions being independent from each other and one range being used for read allocations and one for write allocations.

15. The method of claim 1, wherein the prefetcher includes a read queue for prefetched read requests, a write queue for prefetched write requests, and an arbiter configured to arbitrate the read queue and the write queue.

16. The method of 15, wherein the prefetcher further includes a read counter coupled to the read queue to keep track of a defined read prefetch distance and delaying further read prefetches if the defined read prefetch distance reaches a configurable threshold, and a write counter coupled to the write queue to keep track of a defined write prefetch distance and for delaying further write prefetches if the defined write prefetch distance reaches a configurable threshold, wherein the arbiter is configured to arbitrate the read queue and the write queue in dependence on the read counter and the write counter.

17. The method of claim 1, wherein the number of queue slots of the read queue and the number of issued read prefetches are combined with credit information for read from the I/O packet processing unit to form a link read credit information; and
the number of queue slots of the write queue and the number of issued write prefetches are combined with the credit information for write from the I/O packet processing unit to form a link write credit information.

18. A non-transitory computer readable storage medium having instructions stored thereon that when executed by a computer, implement a method for operating an I/O controller coupled to a processing unit and to a memory, wherein the I/O controller includes an I/O link interface for receiving data packets having virtual addresses, an address translation unit having an address translator for translating received virtual addresses into real addresses by translation control entries and a cache allocated to the address translator for caching a number of the translation control entries, and an I/O packet processing unit for checking the data packets received at the link interface and for forwarding the checked data packets to the address translation unit, the method comprising:
forwarding, with a prefetcher, address translation prefetch information from a data packet received at the I/O link interface to the address translation unit; and
fetching the translation control entry for the data packet by means of the address translation prefetch information from the allocated cache or, if the translation control entry is not available in the allocated cache, from the memory,
wherein the address translation unit further includes a bit selection unit configured to select a first parameter indicating I/O page size and a second parameter indicating translation control entry table size index bits from the received virtual address.

* * * * *